US010120255B2

(12) United States Patent
Chen et al.

(10) Patent No.: US 10,120,255 B2
(45) Date of Patent: Nov. 6, 2018

(54) DISPLAY DEVICE

(71) Applicant: InnoLux Corporation, Miao-Li County (TW)

(72) Inventors: Chien-Hung Chen, Miao-Li County (TW); Hsia-Ching Chu, Miao-Li County (TW); Ming-Chien Sun, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/447,249

(22) Filed: Mar. 2, 2017

(65) Prior Publication Data
US 2017/0269448 A1 Sep. 21, 2017

(30) Foreign Application Priority Data
Mar. 16, 2016 (TW) .............................. 105108056 A

(51) Int. Cl.
*G02F 1/1343* (2006.01)
*G02F 1/1362* (2006.01)
*G02F 1/1335* (2006.01)

(52) U.S. Cl.
CPC .... *G02F 1/136286* (2013.01); *G02F 1/13439* (2013.01); *G02F 1/133512* (2013.01); *G02F 1/134309* (2013.01); *G02F 2201/121* (2013.01); *G02F 2201/123* (2013.01)

(58) Field of Classification Search
CPC ................. G02F 2001/134345; G02F 1/13624
See application file for complete search history.

(56) References Cited

U.S. PATENT DOCUMENTS

2011/0234935 A1* 9/2011 Konno .............. G02F 1/134363
349/43

FOREIGN PATENT DOCUMENTS

| KR | 20080071255 A | 8/2008 |
|---|---|---|
| TW | 200742085 A | 11/2007 |
| TW | 200809368 A | 2/2008 |

* cited by examiner

*Primary Examiner* — Phu Vu
(74) *Attorney, Agent, or Firm* — Bacon & Thomas, PLLC

(57) ABSTRACT

A display panel is disclosed, which includes: a first substrate; plural scan lines disposed on the first substrate and extending along a first direction; plural data lines disposed on the first substrate and extending along a second direction, wherein at least one pixel region is defined by the scan lines and the data lines, and the first direction and the second direction are different; a common electrode disposed in the pixel region; and a metal line electrically connecting to the common electrode and extending along the first direction, wherein the metal line has a first portion overlapping the common electrode and a second portion overlapping one of the data lines; wherein the first portion has a first maximum width along the second direction, the second portion has a second maximum with along the second direction, and the first maximum width is greater than the second maximum width.

20 Claims, 10 Drawing Sheets

DISPLAY DEVICE

CROSS REFERENCE TO RELATED APPLICATION

This application claims the benefits of the Taiwan Patent Application Serial Number 105108056, filed on Mar. 16, 2016, the subject matter of which is incorporated herein by reference.

BACKGROUND

1. Field

The present disclosure relates to a display device and, more particularly, to a display device in which metal lines electrically connecting to common electrodes have special shapes.

2. Description of Related Art

With the continuous development of technology related to displays, there is a trend in the display industry toward more compact, thinner and lighter products. Thus, thin displays, such as liquid crystal display devices, organic light-emitting diode display devices and inorganic light-emitting diode display devices have substituted for CRT displays as the dominant display devices in the market. Thin displays have an extensive application scope, and we can see them in many of consumer electronics, such as mobile phones, laptops, video cameras, still cameras, music players, mobile navigators, TV sets, etc.

Therein, liquid crystal display devices have been well developed and popular among consumers. However, in view of the consumers' increasing requirements to display quality of display devices, almost every dealer in this industry is investing in advancing display devices particularly in terms of display quality.

In the liquid crystal display devices, tilts of liquid crystal molecules can be controlled by adjusting voltages between pixel electrodes and common electrodes, to achieve the on or off states. Herein, signals provided to the common electrodes are transmitted via metal lines. If an alignment error such as an alignment shift between the common electrodes and the metal lines are occurred during the preparing process of the display device, the common electrodes and the metal lines cannot electrically connect accurately in a severe situation, resulting in the yield of the display device reduced.

Therefore, it is desirable to provide a display device, wherein the risk of the alignment error between the common electrodes and the metal lines occurred during the preparing process of the display device can be reduced; so the yield of the display device can further be improved.

SUMMARY

An object of the present disclosure is to provide a display device, wherein the alignment error between a common electrode and a metal line electrically connecting thereto occurred in the preparing process of the display device can be prevented or the transmittance of the display device can be improved, by adjusting the relative positions of the common electrode and the metal line.

In one embodiment of the present disclosure, the display device comprises: a first substrate; plural scan lines disposed on the first substrate and extending along a first direction; plural data lines disposed on the first substrate and extending along a second direction, wherein at least one pixel region is defined by the scan lines and the data lines, and the first direction and the second direction are different; a common electrode disposed in the pixel region; and a metal line electrically connecting to the common electrode and extending along the first direction, wherein the metal line has a first portion and a second portion, the first portion partially overlaps the common electrode, and the second portion overlaps one of the data lines. Herein, the first portion has a first maximum width along the second direction, the second portion has a second maximum width along the second direction, and the first maximum width is greater than the second maximum width.

Moreover, in another embodiment of the present disclosure, the display device comprises: a first substrate; plural scan lines disposed on the first substrate and extending along a first direction; plural data lines disposed on the first substrate and extending along a second direction, wherein at least one pixel region is defined by the scan lines and the data lines, and the first direction and the second direction are different; a common electrode disposed in the pixel region; and a metal line electrically connecting to the common electrode and extending along the first direction, wherein the metal line has a first portion and a second portion, the second portion overlaps one of the data lines, the first portion is a region of the metal line excluding the second portion, and the first portion partially overlaps the common electrode. Herein, the first portion has a first maximum width along the second direction, the second portion has a second maximum width along the second direction, and the first maximum width is greater than the second maximum width.

In the display device of the present disclosure, the metal line has a first portion and a second portion, wherein the second portion overlaps the data line, and the first portion partially overlaps the common electrode. In other words, the first portion is a region of the metal line excluding the second portion, and the first portion partially overlaps the common electrode. When a first maximum width of the first portion along the second direction (i.e. the extending direction of the data line) is greater than a second maximum width of the second portion along the second direction, the problem that the metal line and the common electrode cannot electrically connect to each other accurately caused by the alignment error occurred in the preparing process of the display device can be prevented. Meanwhile, the electric field intensity of the common electrode can further be improved; and tilts of liquid crystal molecules in this region can be well controlled when the tilts of the liquid crystal are controlled by the common electrode together with a pixel electrode. Therefore, the generation of the dark lines in this region can be prevented, and the transmittance of the display device can be improved. In addition, since the second maximum width of the second portion is less than the first maximum width of the first portion, the RC loading on the data lines can be further reduced.

Other objects, advantages, and novel features of the disclosure will become more apparent from the following detailed description when taken in conjunction with the accompanying drawings.

DETAILED DESCRIPTION OF EMBODIMENT

The following embodiments when read with the accompanying drawings are made to clearly exhibit the above-mentioned and other technical contents, features and effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the ordinals recited in the specification and the claims such as "above", "over", or "on" are intended not only directly contact with the other substrate or film, but also intended indirectly contact with the other substrate or film.

Figure 1:
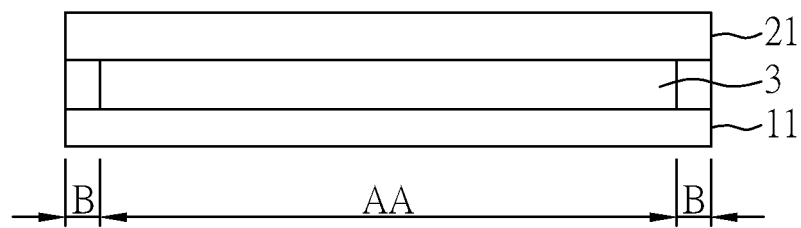
FIG. 1 is a cross-sectional view of a display device according to one embodiment of the present disclosure.

FIG. 1 is a cross-sectional view of a display device according to one embodiment of the present disclosure. The display device of the present embodiment comprises: a first substrate 11; a second substrate 21 opposite to the first substrate 111; and a display medium layer 3 disposed between the first substrate 11 and the second substrate 21. Herein, the display device of the present embodiment comprises: a display region AA; and a border region B adjacent to the display region AA. In the present embodiment, the first substrate 11 and/or the second substrate 21 can be prepared by glass, plastic, flexible materials, or thin films. When the first substrate 11 and/or the second substrate 21 is prepared by the plastic, the flexible materials or the thin films, the display device of the present embodiment is a flexible display device. In addition, in the present embodiment, the display medium layer 3 can be a liquid crystal layer. Furthermore, different units (not shown in FIG. 1) may be disposed on the first substrate 11 and/or the second substrate 21.

Figure 2:
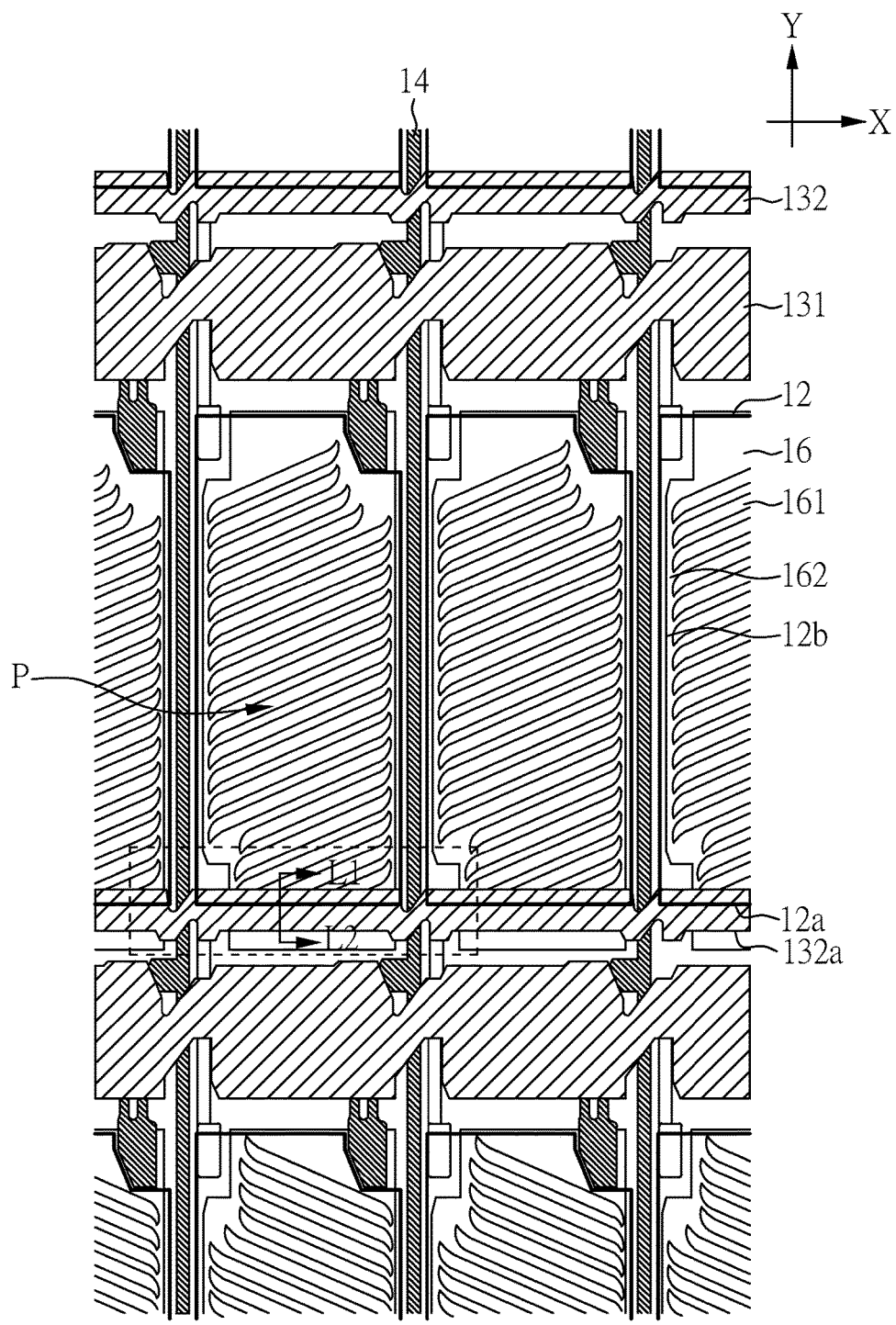
FIG. 2 is a bottom view of a display device according to one embodiment of the present disclosure.
Figure 3:
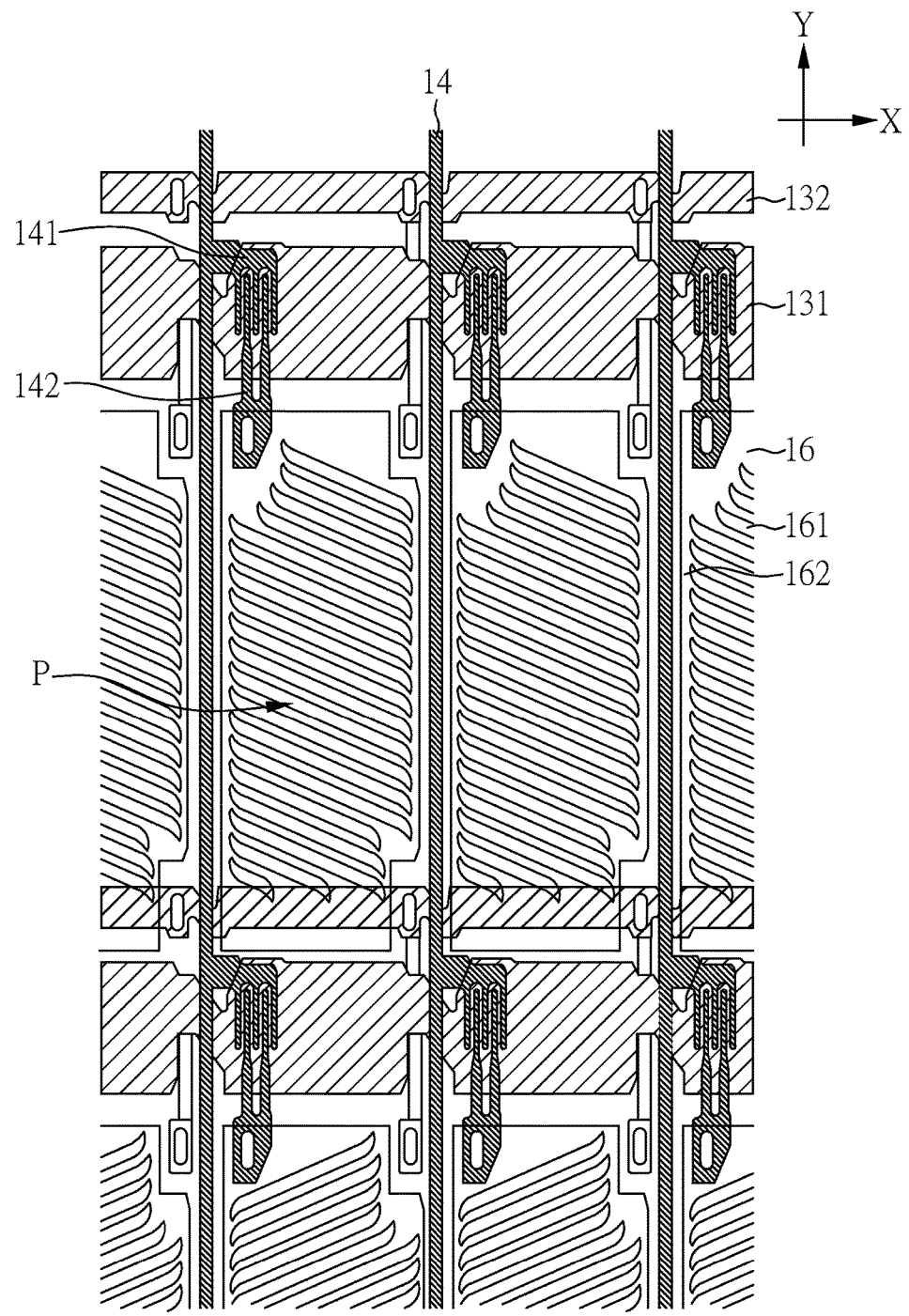
FIG. 3 is a top view of a display device according to one embodiment of the present disclosure.
Figure 4:
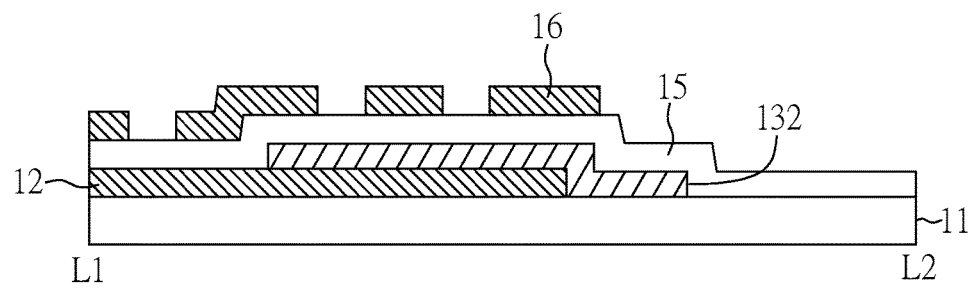
FIG. 4 is a cross-sectional view of a display device according to one embodiment of the present disclosure.

FIG. 2 is a bottom view of a display device according to one embodiment of the present disclosure, which is a view observing from a bottom side of the first substrate 11 to the second substrate 21 in FIG. 1. FIG. 3 is a top view of a display device according to one embodiment of the present disclosure, which is a view observing from an upper side of the second substrate 21 to first substrate 11 in FIG. 1; wherein common electrodes are not shown in FIG. 3. FIG. 4 is a cross-sectional view of a display device according to one embodiment of the present disclosure, which is a cross-sectional view of the line L1-L2 indicated in FIG. 2.

As shown in FIGS. 2 to 4, in the display device of the present disclosure, a common electrode 12 is firstly formed on the first substrate 11. However, in other embodiment of the present disclosure, other layer(s), for example a buffer layer, may be formed between the first substrate 11 and the common electrode 12. Next, a first metal layer is formed on the common electrode 12 and the first substrate 11, wherein the first metal layer is a patterned metal layer and comprises plural scan lines 131 and plural metal lines 132. The metal lines 132 partially cover the common electrode 12 and electrically connect to the common electrode 12. An insulating layer (not shown in the figures) is formed on the first substrate 11, the common electrode 12 and the first metal layer (including the scan lines 131 and the metal lines 132), and an active layer (not shown in the figures) is formed on a region that a thin film transistor unit is to be formed. Then, a second metal layer is formed on the insulating layer (not shown in the figures), wherein the second metal layer is a patterned metal layer and comprises plural data lines 14, plural source electrodes 141 and plural drain electrodes 142. Finally, another insulating layer 15 is formed on the second metal layer, followed by forming pixel electrodes 16 on the insulating layer 15, in which the pixel electrodes 16 electrically connects to the drain electrodes 142. Herein, the insulating layer 15 is represented by a single layer in FIG. 4. However, in other embodiment of the present disclosure, the insulating layer 15 can be a double-layered insulating layer or a multi-layered insulating layer. After the aforementioned process, the units on the first substrate 11 in the display device of the present embodiment are completed. Herein, the preparations of the units on the first substrate 11 of the display device are simply illustrated, but the present disclosure is not limited thereto.

In the present disclosure, the insulating layer can comprise any insulating material such as oxides, nitrides or nitoxides, but the present disclosure is not limited thereto. The first metal layer (including the scan lines 131 and the metal lines 132) and the second metal layer (including the data lines 14, the source electrodes 141 and the drain electrodes 142) can be prepared by any conductive material, such as metals, alloys, metal oxides, metal nitoxides or other electrode materials; but the present disclosure is not limited thereto. The common electrode 12 and the pixel electrodes 16 can be prepared by transparent conductive electrode materials such as ITO, IZO or ITZO; but the present disclosure is not limited thereto. In addition, the units capable of being disposed on the first substrate 11 in the display device of the present disclosure are not limited to those shown in FIGS. 2 to 4; and other layers for forming the thin film transistor units such as active layers and other insulating layers may be formed on the first substrate 11.

As shown in FIGS. 1 to 4, the display device of the present embodiment comprises: a first substrate 11; plural scan lines 131 disposed on the first substrate 11 and extending along a first direction X; plural data lines 14 disposed on the first substrate 11 and extending along a second direction Y, wherein at least one pixel region P is defined by the scan lines 131 and the data lines 14, and the first direction X and the second direction Y are different; a common electrode 12 disposed in the pixel region P; and a metal line 132 electrically connecting to the common electrode 12 and extending along the first direction X. Herein, the first direction X is vertical to the second direction Y. However, in other embodiment of the present disclosure, the first direction X is not necessary to be vertical to the second direction Y, as long as the first direction X and the second direction Y are different.

Figure 5:
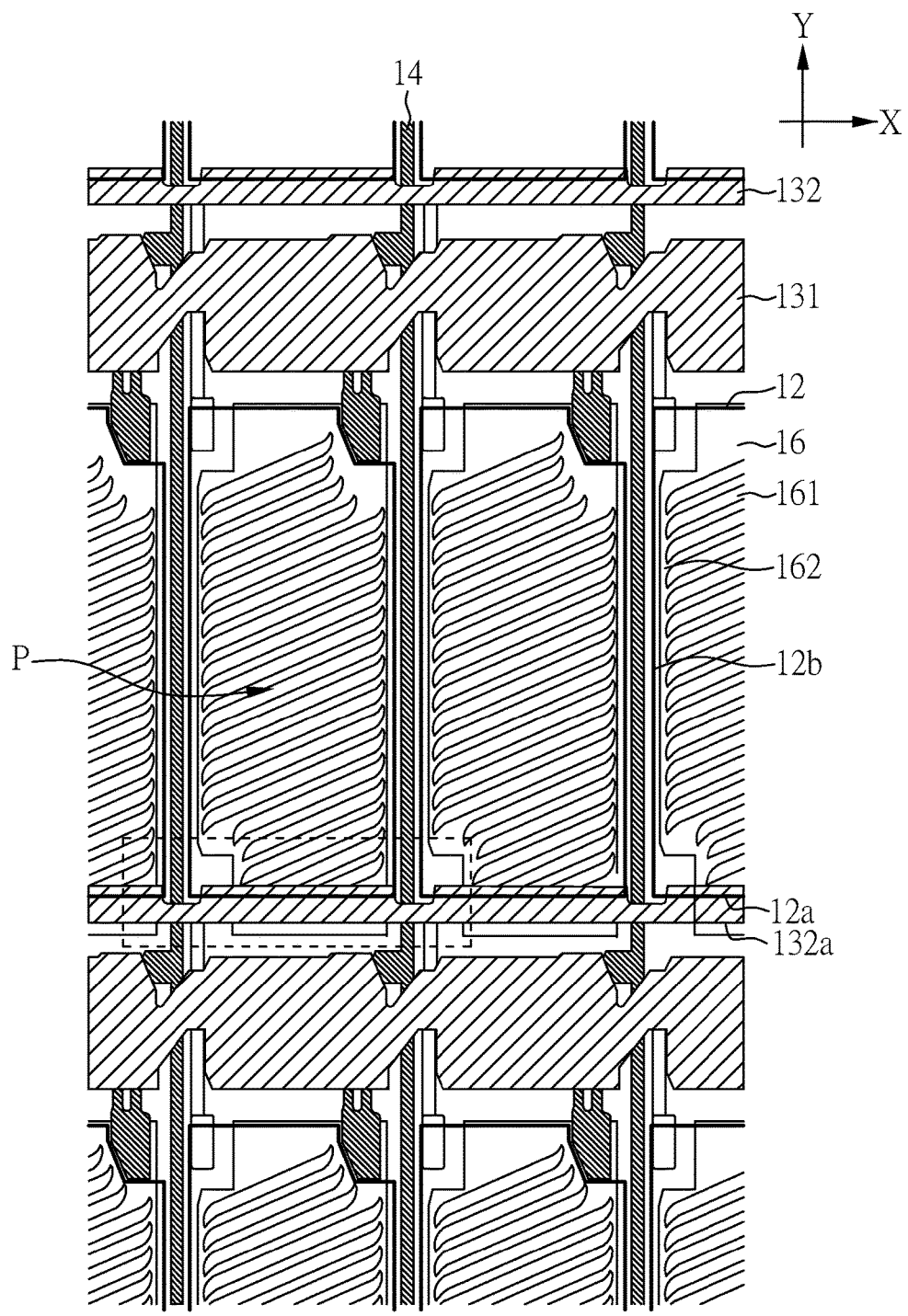
FIG. 5 is a bottom view of a display device according to another embodiment of the present disclosure.

FIG. 5 is a bottom view of a display device according to another embodiment of the present disclosure. The process and the structure of the display device of the present embodiment are similar to those shown in FIGS. 1 to 4, except the metal lines 132 have different shapes.

As shown in FIGS. 2 to 5, when forming the display device of the present embodiment, the common electrodes 12 are firstly formed and then the metal lines 132 are formed on the common electrodes 12; wherein the metal lines 132 partially cover the common electrodes 12 to electrically connect the metal lines 132 with the common electrodes 12. When an alignment error is occurred in the steps for forming the common electrodes 12 and the metal lines 132, the metal lines 132 may not cover the common electrodes 12 in a severe case. In this situation, the metal lines 132 cannot electrically connect to the common electrode 12 accurately, resulting in the yields of the display devices decreased. Hence, in order to prevent the aforementioned situation, the metal lines 132 in the display device of the present disclosure is designed to have special shapes to prevent the incorrect electrical connection between the common electrodes 12 and the metal lines 132 caused by the alignment error.

Figure 6A:
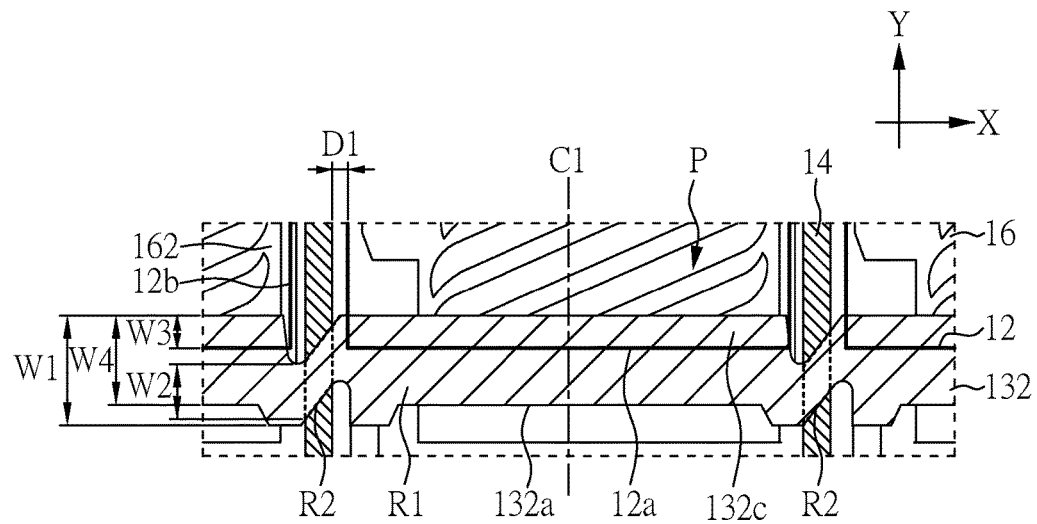
FIG. 6A is an enlarged view of a dot line region indicated in FIG. 2.
Figure 6B:
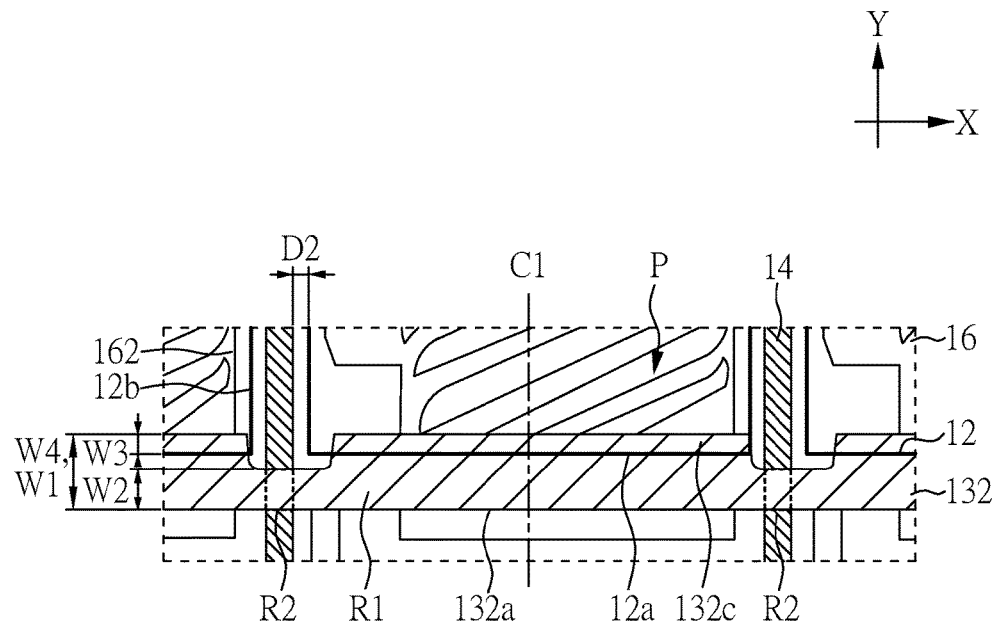
FIG. 6B is an enlarged view of a dot line region indicated in FIG. 5.

FIGS. 6A and 6B are respectively enlarged views of dot line regions indicated in FIGS. 2 and 5. The metal line 132 has a first portion R1 and a second portion R2, the first portion R1 partially overlaps the common electrode 12, and the second portion R2 overlaps one of the data lines 14. In other words, the second portion R2 is the region formed by dot lines and overlaps one of the data lines 14, the first portion R1 is a region of the metal line 132 excluding the second portion R2 (i.e. a region excluding the region formed by the dot lines), and the first portion R1 partially overlaps the common electrode 12. In order to prevent the situation that an incorrect electrical connection is occurred between the common electrode 12 and the metal line 132 due to the alignment error therebetween, as shown in FIGS. 6A and 6B, the first portion R1 has a first maximum width W1 along the second direction Y, the second portion R2 has a second maximum W2 width along the second direction Y, and the first maximum width W1 is greater than the second maximum width W2 (i.e. W1>W2).

As shown in FIGS. 2, 5 to 6B, in one pixel region P, the length of the metal line 132 at the first direction X is obviously greater than the width of the metal line 132 at the second direction Y. Hence, for the correct electrical connection between the common electrode 12 and the metal line 132, the influence of the alignment error at the second direction Y is more significant. As shown in FIGS. 6A and 6B, in consideration of the alignment error between the common electrode 12 and the metal line 132 at the second direction Y, when the first maximum width W1 of the first region R1 of the metal line 132 is greater than the second maximum width W2 of the second region R2 of the metal line 132, the problem of the incorrect electric connection between the metal line 132 and the common electrode 12 caused by the alignment error occurred in the preparing process of the display device can be effectively prevented.

As shown in FIGS. 2, 5 to 6B, the problem of the incorrect electric connection between the metal line 132 and the common electrode 12 caused by the alignment error is mainly occurred when an edge 12a of the common electrode 12 overlaps an edge 132a of the metal line 132 (based on the direction shown in the figures of the present disclosure). If the edge 12a of the common electrode 12 locates below the edge 132a of the metal line 132 (based on the direction shown in the figures of the present disclosure), the common electrode 12 may overlap the scan line 131, resulting in the incorrect electric connection. Hence, as shown in FIGS. 6A and 6B, the metal line 132 is designed to be locating above the edge 12a of the common electrode 12 to prevent the above situation.

In addition, as shown in FIGS. 6A and 6B, the tilt directions of the liquid crystal molecules on the first region R1 of the metal line 132 are irregular, which may cause disclination (which cause dark lines in the on state of the display device), resulting in the transmittance of the display device reduced. Hence, when the first region R1 of the metal line has a larger first maximum width W1, the electric field intensity of the common electrode 12 can be enhanced. Therefore, when the tilts of the liquid crystal molecules are controlled by the pixel electrode 16 together with the common electrode 12, the tilts of the liquid crystal molecules on the first region R1 of the metal line 132 can be well controlled, the disclination can be inhibited, and the transmittance of the display device can be improved.

Furthermore, as shown in FIGS. 6A and 6B, the second region R2 of the metal line 132 overlaps the data line 14, and the capacitance therebetween may influence the RC loading of the data line 14. Hence, the second maximum width W2 of the second region R2 is not identical to the first maximum width W1 of the first region R1, but is less than the first maximum width W1 of the first region R1. Therefore, the RC loading of the data line 14 can be reduced.

As shown in FIGS. 6A and 6B, the first maximum width W1 of the first region R1 of the metal line 132 is greater than the second maximum width W2 of the second region R1 thereof, so the problem that the incorrect electric connection between the metal line 132 and the common electrode 12 caused by the alignment error during the preparing process can be effectively prevented. However, if the first maximum width W1 is too large, the aperture ratio may be decreased and off design, the transmittance of the display device will be reduced. Hence, the first maximum width W1 is less than two times of the second maximum width W2 (i.e. W1<2W2).

Figure 7:
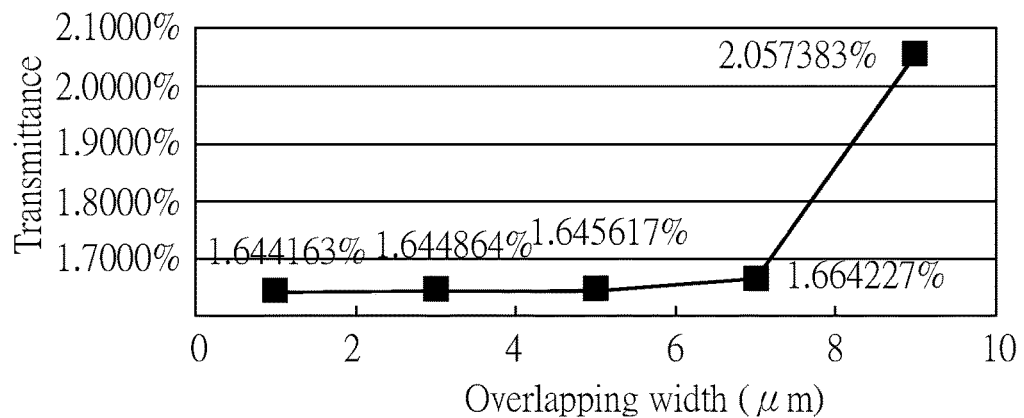
FIG. 7 shows a simulation result in which a first portion with different first maximum width of a metal line in a display device according to one embodiment of the present disclosure.

FIG. 7 shows a simulation result in which a first portion with different first maximum width of a metal line in a display device according to one embodiment of the present disclosure. The display device comprising the first substrate 11 and the units disposed thereon but not including the second substrate 21 and the display medium layer 3 shown in FIG. 1 is measured herein. The units disposed on the first substrate 11 are shown in FIG. 5. In addition, the first region R1 of the metal line 132 has an overlapping region 132c which overlaps the common electrode 12, and the overlapping width of the X axis in FIG. 7 refers to the third with W3 of the overlapping region 132c along the second direction Y (as shown in FIG. 6B).

As show in FIGS. 6B and 7, when the third width W3 of the overlapping region 132c which overlaps the common electrode 12 is 1 µm, the transmittance is the minimum. When the third width W3 is increased, the transmittance is enhanced. When the third width W3 is increased to 9 µm, the increase of the transmittance is the most significant. These results indicate that when the third width W3 of the overlapping region 132c which overlaps the common electrode 12 is increased, the electric field of the common electrode 12 can be improved. Hence, when the liquid crystal molecules are controlled by the common electrode 12 together with the pixel electrode 16, the tilts of the liquid crystal molecules on the first region R1 of the metal line 132 can be well controlled; and therefore the disclination in this region can be inhibited and the transmittance of the display device can be improved.

However, if the third width W3 of the overlapping region 132c which overlaps the common electrode 12 is increased without an upper limit, the aperture ratio of the display device will be decreased and off design. Hence, in the present embodiment, the third width W3 still has its upper limit, in which the third width is not more than two times of the second maximum width W2.

Furthermore, as shown in FIGS. 2 and 5, the display device of the present embodiment further comprises a pixel electrode 16 in one pixel region P. The pixel electrode 16 has plural slits 161 and a continuous side part 162, wherein the continuous side part 162 extends along the second direction Y. More specifically, the continuous side part 162 of the pixel electrode 16 has an edge which is continuous and extends along the second direction Y. As shown in FIGS. 6A and 6B, the common electrode 12 has an electrode side 12b, which is adjacent to the continuous side part 162. In addition, as shown in FIGS. 6A and 6B, a distance D1 between the common electrode 12 and one of the data lines 14 adjacent thereto is between 2 µm and 10 µm. Herein, the distance D1 between the common electrode 12 and one of the data lines 14 refers to the distance between the projections of the common electrode 12 and the one of the data lines 14 projected on the first substrate (not shown in the figure).

Figure 8:
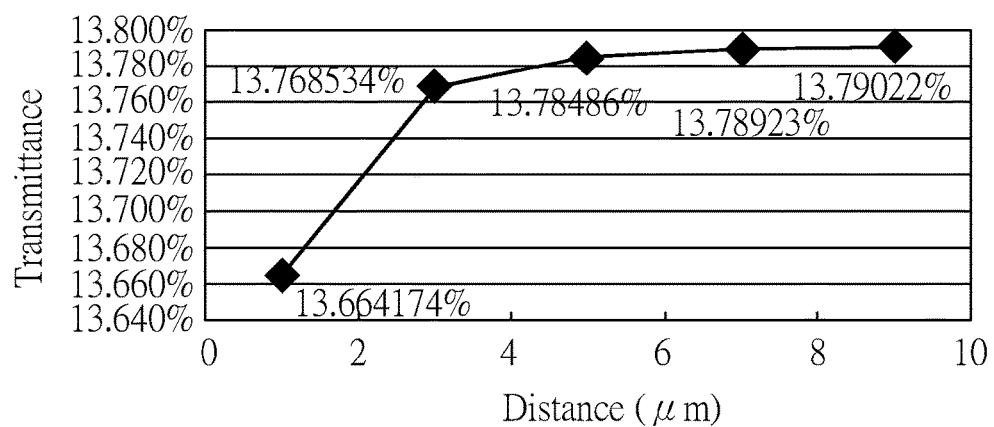
FIG. 8 shows a simulation result in which a gap between a common electrode and a data line has different distance in a display device according to one embodiment of the present disclosure.

FIG. 8 shows a simulation result in which a gap between a common electrode and a data line has different distance in a display device according to one embodiment of the present disclosure. The display device comprising the first substrate 11 and the units disposed thereon but not including the second substrate 21 and the display medium layer 3 shown in FIG. 1 is measured herein. The units disposed on the first substrate 11 are shown in FIG. 5.

As shown in FIGS. 6B and 8, when the distance D1 between the common electrode 12 and the data line 14 is 1 µm, the transmittance is the minimum. When the distance D1 is increased, the transmittance is also increased. When the distance D1 is more than 2 µm, the increase of the transmittance become slow. These results indicate that when the distance D1 between the common electrode 12 and the data line 14 is between 2 µm and 10 µm, good transmittance of the display device can be obtained.

Additionally, as shown in FIGS. 6A and 6B, a central line C1 extending along the second direction Y in the pixel region P is defined; wherein the central line C1 refers to a reference line at the center of the pixel region P, and the distances between the central line C1 and two adjacent data lines 14 are the same. The metal line 132 has an overlapping region 132c which overlaps the common electrode 12. The overlapping region 132c of the metal line 132 has a third width W3 at the central line C1 along the second direction Y, the metal line 132 has a fourth width W4 at the central line C1 along the second direction Y, and a ratio of the third width W3 to the fourth width W4 is between 0.4:1 and 0.99:1. Alternatively, the overlapping region 132c of the metal line 132 has a third width W3 along the second direction Y, and a ratio of the third width W3 to the first maximum with W1 is between 0.4:1 and 0.99:1.

Figure 9:
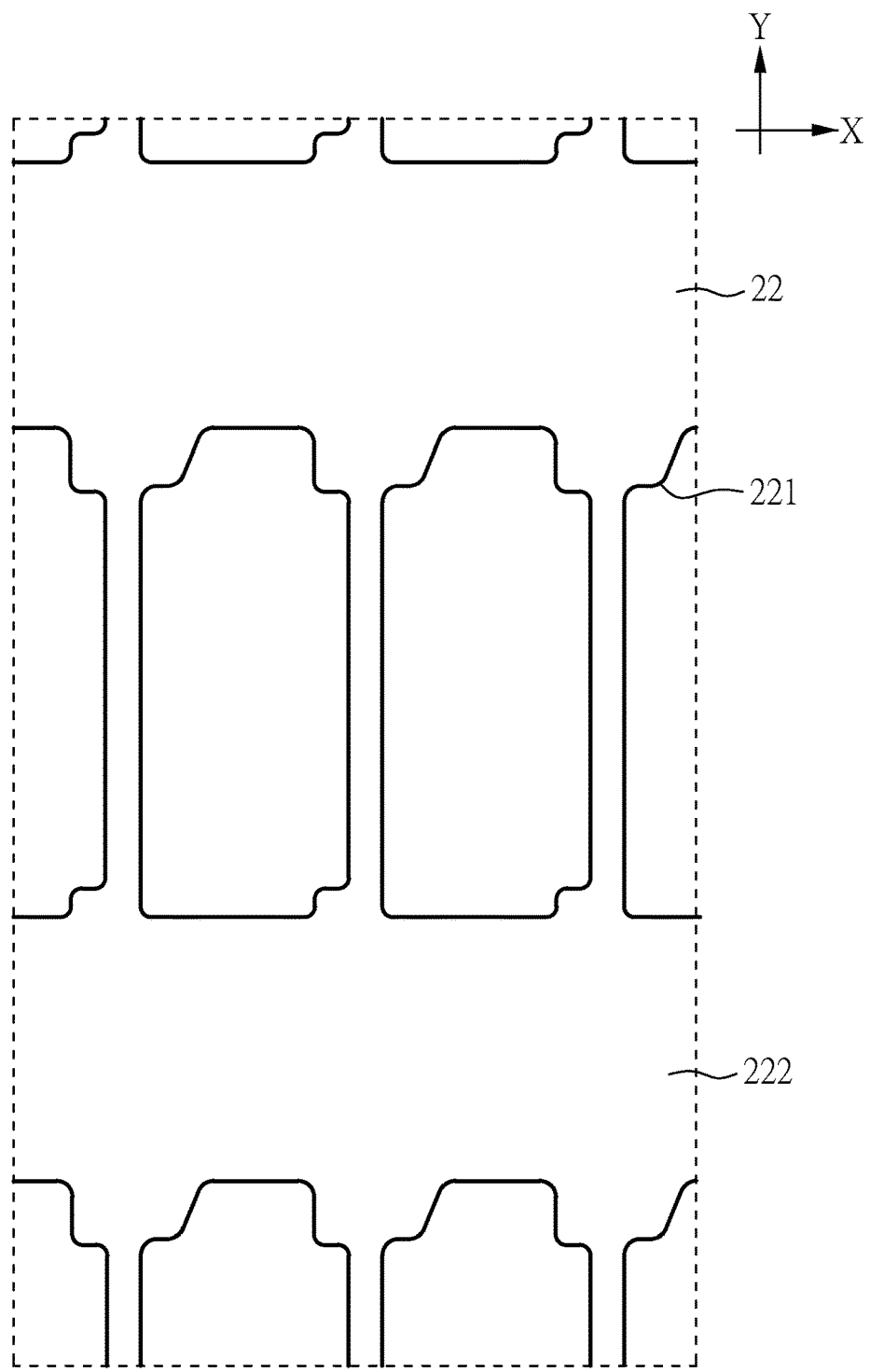
FIG. 9 is a perspective view of a black matrix layer in a display device according to one embodiment of the present disclosure.

FIG. 9 is a perspective view of a black matrix layer in a display device according to one embodiment of the present disclosure. As shown in FIG. 1, the display device of the present embodiment further comprises a second substrate 21. As shown in FIG. 9, a black matrix layer 22 is disposed on the second substrate 21, wherein the black matrix layer 22 has a light shielding region 222 and a light transmitting region 221.

Figure 10:
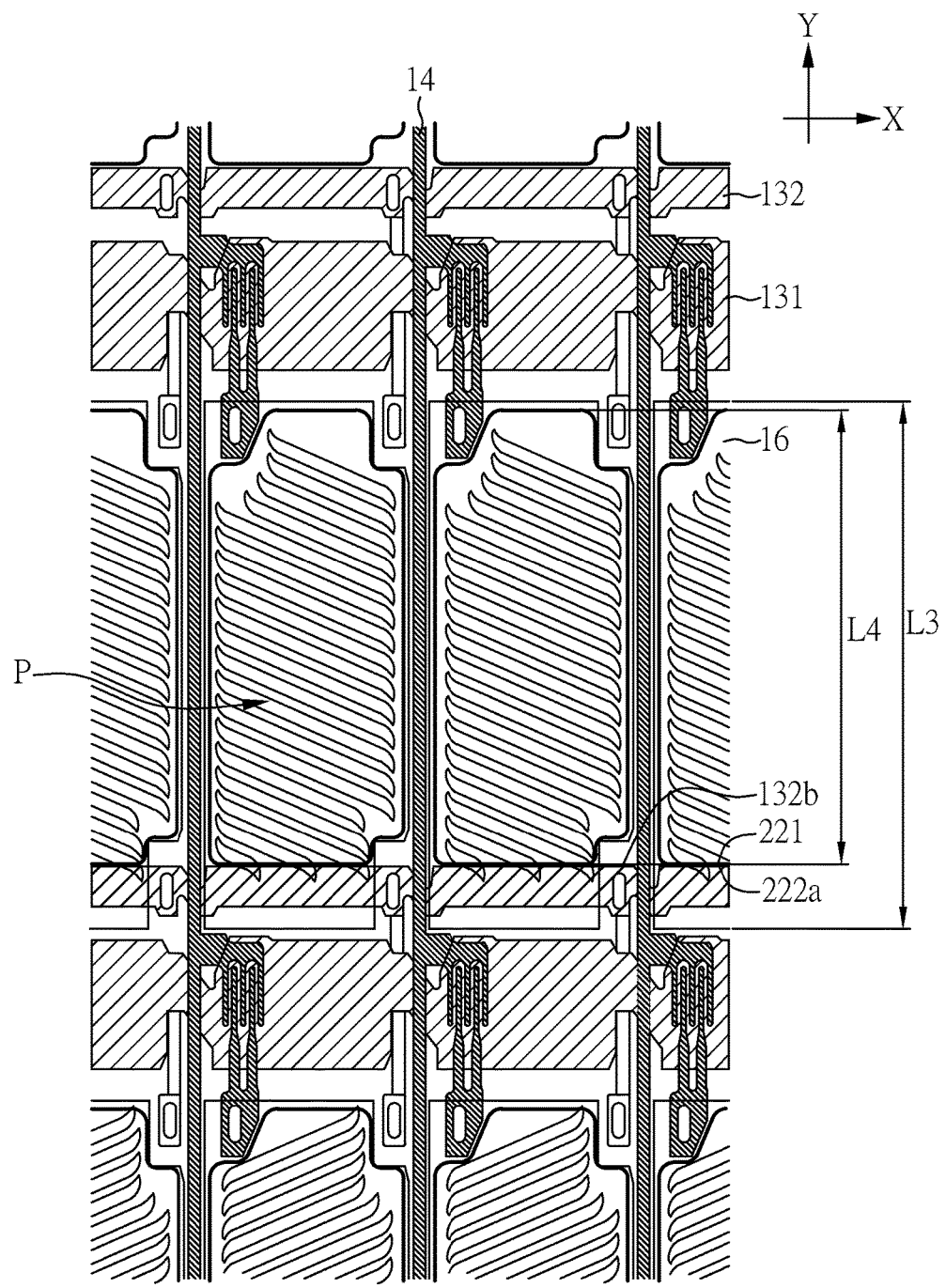
FIG. 10 is a perspective view of a display device according to one embodiment of the present disclosure.
Figure 11:
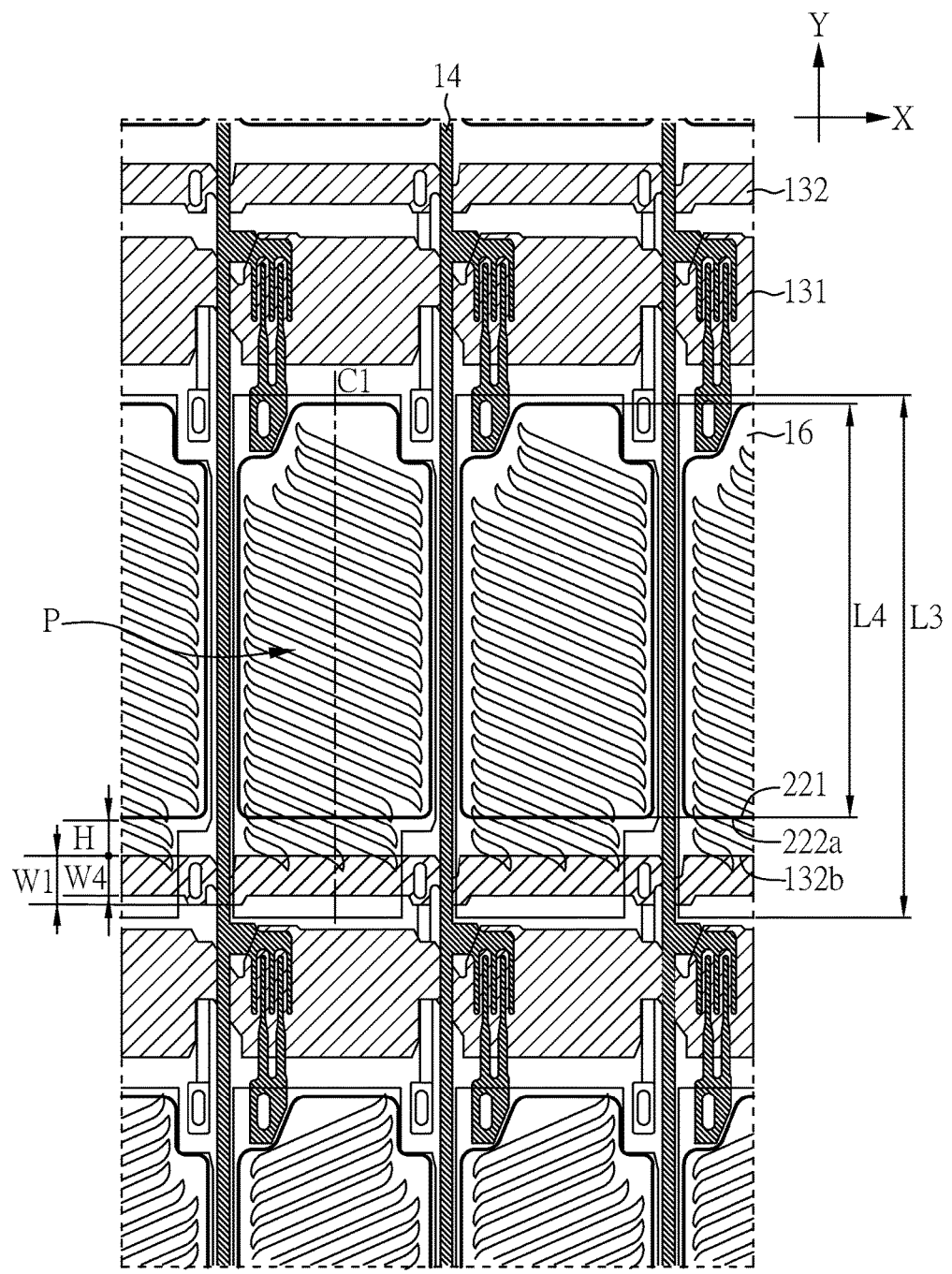
FIG. 11 is a perspective view of a display device according to another embodiment of the present disclosure.

FIGS. 10 and 11 are perspective views of display devices according to two different embodiments of the present disclosure, which are perspective views that the black matrix layer shown in FIG. 9 is laminated on the units on the first substrate shown in FIG. 3. As shown in FIGS. 9 and 10, the light transmitting region 221 of the black matrix layer 22 exposes the pixel region P, and the light shielding region 222 of the black matrix layer 22 covers the scan lines 131, the data lines 14 and the metal line 132. The light shielding region 222 has a shielding edge 222a extending along the first direction X, and the metal line 132 has a metal edge 132b closest to the shielding edge 222a. In FIG. 10, the metal edge 132b of the metal line 132 overlaps the shielding edge 222a in the pixel region P, so the distance between the metal edge 132b and the shielding edge 222a is 0 µm. However, in another embodiment shown in FIG. 11, the distance H between the metal edge 132b and the shielding edge 222a cannot be more than the first maximum W1. In another embodiment, at the central line C1 extending along the second direction Y in the pixel region P, the metal line 132 has a fourth width W4, and a distance H between the shielding edge 222a and the metal edge 132a cannot be more than the fourth width W4.

Hence, as shown in FIGS. 10 and 11, when the distance H between the shielding edge 222a and the metal edge 132b is between 0 µm and the fourth width W4, the light shielding region 222 of the black matrix layer 22 (as shown in FIG. 9) can cover the region near to the metal line 132. Hence, the disclination due to the different tilts of the liquid crystal molecules or the different response rate of the liquid crystal molecules can be covered. In addition, when the metal edge 132b and the shielding edge 222a overlap, for example the embodiment shown in FIG. 10, a maximum transmittance of the display device can be obtained. Meanwhile, in order to prevent the transmittance lost too much, the distance H between the shielding edge 222a and the metal edge 132b cannot be more than the fourth width W4.

Moreover, as shown in FIGS. 6A, 6B, 10 and 11, the pixel electrode 16 has an electrode length L3 along the second direction Y, and the light transmitting region 221 has an opening length L4 along the second direction Y. If the first maximum width W1 of the first region R1 of the metal line 132 is represented by "A", the electrode length L3 of the pixel electrode 16 is represented by "B", and the opening length L4 of the light transmitting region 221 is represented by "C", the "A", the "B" and the "C" satisfy Equations (I) and (II) below:

$$0.01B \leq A \leq 0.1B \quad \text{[Equation (I)]}$$

$$0.6B \leq C \leq 0.99B. \quad \text{[Equation (II)]}$$

When the first maximum width W1 of the first region R1 of the metal line 132, the electrode length L3 of the pixel electrode 16 and the opening length L4 of the light transmitting region 221 satisfy the Equations (I) and (II) above, the display device can have good transmittance.

As show in FIG. 1, in the display device of the aforementioned embodiments, a backlight module (not show in the figure) can be disposed below the first substrate 11. In addition, the display device provided by the aforementioned embodiments can be used with a touch panel to form a touch display device. Meanwhile, the display device or the touch display device provided by the aforementioned embodiments can be applied to any electronic devices known in the art that need a display screen, such as displays, mobile phones, laptops, video cameras, still cameras, music players, mobile navigators, TV sets, and other electronic devices that display images.

Although the present disclosure has been explained in relation to its embodiment, it is to be understood that many other possible modifications and variations can be made without departing from the spirit and scope of the disclosure as hereinafter claimed.

What is claimed is:

1. A display device, comprising:
   a first substrate;
   a second substrate opposite to the first substrate;
   plural scan lines disposed on the first substrate and extending along a first direction;
   plural data lines disposed on the first substrate and extending along a second direction, wherein at least one pixel region is defined by the scan lines and the data lines, and the first direction and the second direction are different;
   a common electrode disposed in the pixel region;
   a metal line electrically connecting to the common electrode and extending along the first direction, wherein the metal line has a first portion and a second portion, the first portion partially overlaps the common electrode, and the second portion overlaps one of the data lines; and
   a black matrix layer disposed on the second substrate, wherein the black matrix layer has a light shielding region extending along the first direction, and the light shielding region covers the metal line;
   wherein the first portion has a first maximum width along the second direction, the second portion has a second maximum width along the second direction, and the first maximum width is greater than the second maximum width,
   wherein the metal lines has a metal edge closest to a shielding edge of the light shielding region, the shielding edge extends along the first direction, and a distance between the shielding edge and the metal edge is between 0 μm and the first maximum width.

2. The display device of claim 1, wherein the first maximum width is less than two times of the second maximum width.

3. The display device of claim 1, wherein a distance between the common electrode and one of the data lines adjacent thereto is between 2 μm and 10 μm.

4. The display device of claim 1, wherein a central line extending along the second direction in the pixel region is defined, the metal line has an overlapping region overlapping the common electrode, the overlapping region has a third width at the central line along the second direction, the metal line has a fourth width at the central line along the second direction, and a ratio of the third width to the fourth width is between 0.4:1 and 0.99:1.

5. The display device of claim 1, wherein the metal line has an overlapping region overlapping the common electrode, the overlapping region has a third width along the second direction, and a ratio of the third width to the first maximum with is between 0.4:1 and 0.99:1.

6. The display device of claim 1, wherein the metal line has an overlapping region overlapping the common electrode, the overlapping region has a third width along the second direction, the third width is less than two times of the second maximum width.

7. The display device of claim 1, wherein the black matrix layer further comprises a light transmitting region, the light transmitting region exposes the pixel region, and the light shielding region covers the scan lines and the data lines.

8. The display device of claim 1, wherein the black matrix layer further comprises a light transmitting region, the light transmitting region exposes the pixel region, and the light shielding region covers the scan lines and the data lines; wherein the metal line has a metal edge mostly closed to the shielding edge; wherein a central line extending along the second direction in the pixel region is defined, the metal line has a fourth width at the central line along the second direction, and a distance between the shielding edge and the metal edge is between 0 μm and the fourth width.

9. The display device of claim 1, further comprising a pixel electrode, wherein the pixel electrode is disposed in the pixel region; wherein the black matrix layer has a light transmitting region, the light transmitting region exposes the pixel electrode, and the light shielding region covers the scan lines and the data lines; wherein the first maximum width is represented by "A", the pixel electrode has an electrode length along the second direction, the electrode length is represented by "B", the light transmitting region has an opening length along the second direction, the opening length is represented by "C", and the "A", the "B" and the "C" satisfy Equations (I) and (II) below:

$$0.01B \leq A \leq 0.1B \qquad \text{[Equation (I)]}$$

$$0.6B \leq C \leq 0.99B. \qquad \text{[Equation (II)]}$$

10. The display device of claim 1, wherein the common electrode has an edge, and the metal line overlaps the edge.

11. A display device, comprising:
    a first substrate;
    a second substrate opposite to the first substrate;
    plural scan lines disposed on the first substrate and extending along a first direction;
    plural data lines disposed on the first substrate and extending along a second direction, wherein at least one pixel region is defined by the scan lines and the data lines, and the first direction and the second direction are different;
    a common electrode disposed in the pixel region;
    a metal line electrically connecting to the common electrode and extending along the first direction, wherein the metal line has a first portion and a second portion, the second portion overlaps one of the data lines, the first portion is a region of the metal line excluding the second portion, and the first portion partially overlaps the common electrode; and
    a black matrix layer disposed on the second substrate, wherein the black matrix layer has a light shielding region extending along the first direction, and the light shielding region covers the metal line;

wherein the first portion has a first maximum width along the second direction, the second portion has a second maximum width along the second direction, and the first maximum width is greater than the second maximum width, wherein the metal lines has a metal edge closest to a shielding edge of the light shielding region, the shielding edge extends along the first direction, and a distance between the shielding edge and the metal edge is between 0 μm and the first maximum width.

12. The display device of claim 11, wherein the first maximum width is less than two times of the second maximum width.

13. The display device of claim 11, wherein a distance between the common electrode and one of the data lines adjacent thereto is between 2 μm and 10 μm.

14. The display device of claim 11, wherein a central line extending along the second direction in the pixel region is defined, the metal line has an overlapping region overlapping the common electrode, the overlapping region has a third width at the central line along the second direction, the metal line has a fourth width at the central line along the second direction, and a ratio of the third width to the fourth width is between 0.4:1 and 0.99:1.

15. The display device of claim 11, wherein the metal line has an overlapping region overlapping the common electrode, the overlapping region has a third width along the second direction, and a ratio of the third width to the first maximum with is between 0.4:1 and 0.99:1.

16. The display device of claim 11, wherein the metal line has an overlapping region overlapping the common electrode, the overlapping region has a third width along the second direction, the third width is less than two times of the second maximum width.

17. The display device of claim 11, wherein the black matrix layer further comprises a light transmitting region, the light transmitting region exposes the pixel region, and the light shielding region covers the scan lines and the data lines.

18. The display device of claim 11, wherein the black matrix layer further comprises a light transmitting region, the light transmitting region exposes the pixel region, and the light shielding region covers the scan lines and the data lines; wherein the metal line has a metal edge mostly closed to the shielding edge; wherein a central line extending along the second direction in the pixel region is defined, the metal line has a fourth width at the central line along the second direction, and a distance between the shielding edge and the metal edge is between 0 μm and the fourth width.

19. The display device of claim 11, further comprising a pixel electrode, wherein the pixel electrode is disposed in the pixel region; wherein the black matrix layer has a light transmitting region, the light transmitting region exposes the pixel electrode, and the light shielding region covers the scan lines and the data lines; wherein the first maximum width is represented by "A", the pixel electrode has an electrode length along the second direction, the electrode length is represented by "B", the light transmitting region has an opening length along the second direction, the opening length is represented by "C", and the "A", the "B" and the "C" satisfy Equations (I) and (II) below:

$0.01B \leq A \leq 0.1B$ [Equation (I)]

$0.6B \leq C \leq 0.99B.$ [Equation (II)]

20. The display device of claim 11, wherein the common electrode has an edge, and the metal line overlaps the edge.

* * * * *

UNITED STATES PATENT AND TRADEMARK OFFICE
CERTIFICATE OF CORRECTION

PATENT NO. : 10,120,255 B2
APPLICATION NO. : 15/447249
DATED : November 6, 2018
INVENTOR(S) : Chien-Hung Chen et al.

Page 1 of 1

It is certified that error appears in the above-identified patent and that said Letters Patent is hereby corrected as shown below:

In the Claims

In Claim 1, at Line 51, in Column 9:
"the metal lines" should be changed to --the metal line--.

In Claim 11, at Line 6, in Column 11:
"the metal lines" should be changed to --the metal line--.

Signed and Sealed this
Twenty-eighth Day of January, 2025

Coke Morgan Stewart
*Acting Director of the United States Patent and Trademark Office*